No. 733,593. PATENTED JULY 14, 1903.
O. A. POIRIER.
CLEANING DEVICE FOR DISK DRILLS.
APPLICATION FILED APR. 13, 1903.
NO MODEL.
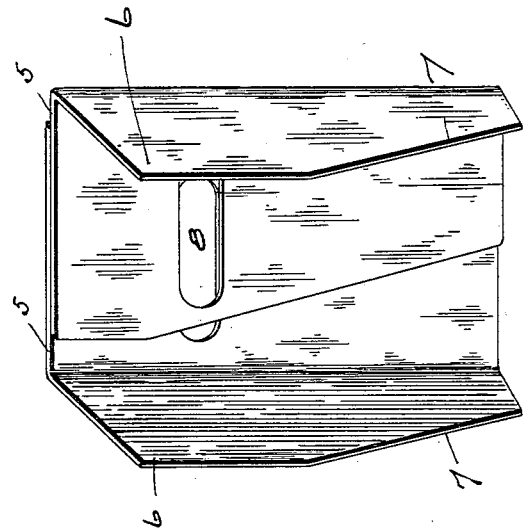
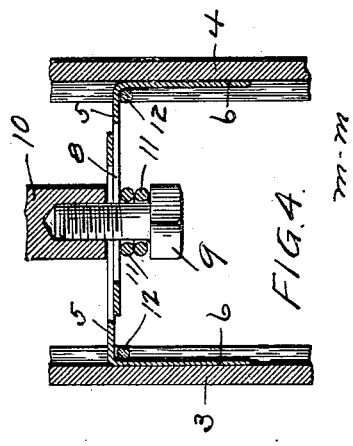
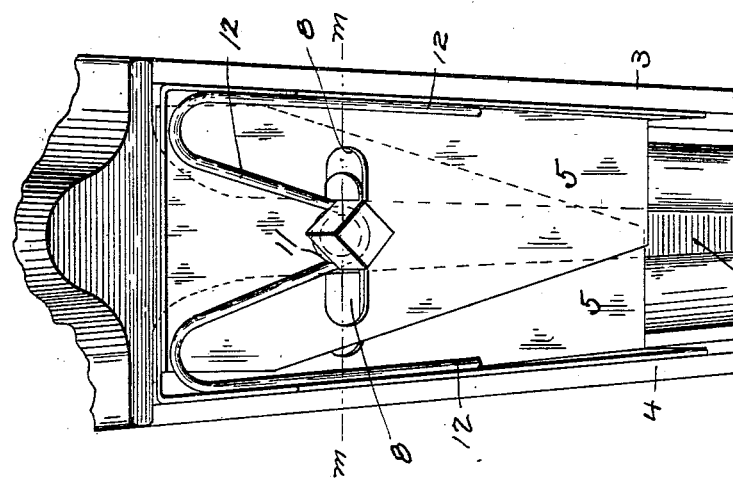
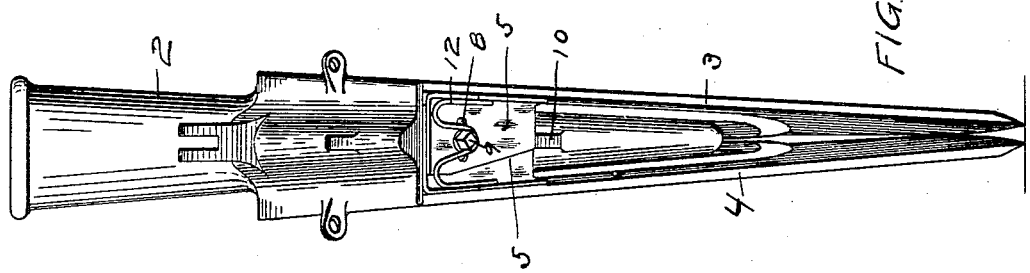
WITNESSES
INVENTOR
OCTAVE A. POIRIER
BY
HIS ATTORNEYS No. 733,593.

Patented July 14, 1903.

UNITED STATES PATENT OFFICE.

OCTAVE A. POIRIER, OF GLADSTONE, MINNESOTA.

CLEANING DEVICE FOR DISK DRILLS.

SPECIFICATION forming part of Letters Patent No. 733,593, dated July 14, 1903.

Application filed April 13, 1903. Serial No. 152,295. (No model.)

*To all whom it may concern:*

Be it known that I, OCTAVE A. POIRIER, of Gladstone, county of Ramsey, State of Minnesota, have invented certain new and useful Improvements in Cleaning Devices for Disk Drills, of which the following is a specification.

My invention relates to drills having disks arranged in pairs, and the object of the invention is to provide means for keeping the inner surfaces of the disks free from an accumulation of mud and dirt that would, if allowed to remain, prevent the disks from entering the soil and soon render them inoperative for the purpose designed.

The invention consists generally in plates yieldingly held between the disks and having edges bearing thereon and adapted to automatically adjust themselves to the surfaces of the disks as they revolve.

Further, the invention consists in various constructions and combinations, all as hereinafter described, and particularly pointed out in the claims.

In the accompanying drawings, forming part of this specification, Figure 1 is a rear view of a drill-boot with the disks secured thereon and my invention applied to the disks. Fig. 2 is an enlarged view of a portion of the boot and disks, showing the cleaning devices more in detail. Fig. 3 is a perspective of the cleaning-plates, and Fig. 4 is a section on the line *m m* of Fig. 2.

In the drawings, 2 represents a boot of ordinary construction, whereon the disks 3 and 4 are mounted. The edges of these disks cooperate to make a drill or furrow in the soil, and when the ground is wet or muddy or the machine is operating in a clay soil considerable difficulty is experienced in the successful operation of the disks on account of the wet soil and clay sticking to the disks and preventing them from entering the ground. Various devices have been used for keeping the inner surfaces of the disks clean; but none of them are provided, as far as I know, with bearing edges of considerable length that are adapted to automatically adjust themselves to the surfaces of the disks. I find this characteristic of the cleaning devices an important one, and I have provided two plates 5, having flanges 6, that are adapted to bear on the inner surfaces of the disks and scrape off any accumulation of mud or clay thereon. The edges of the said flanges, as well as of the plates 5, are preferably provided with inclined or beveled sections 7, which have a drawing or shearing action on the surfaces of the disks and aid materially in keeping them clean. The plates 5 are arranged to overlap each other, as shown in Fig. 3, and are provided with transverse slots 8, which register when the plates are placed together, and are adapted to receive a bolt 9, that passes therethrough and into a web 10 on the boot. The shank of the bolt 9 fits loosely in the slots to allow freedom of movement of the plates 5, which are held, however, against the web 10 by the coils 11 of a spring 12 that is bent substantially in the form of an M and has its ends arranged to bear on the flanges 6 and yieldingly hold them in engagement with the surfaces of the disks. This method of supporting the plates allows them to move up and down and laterally to and from the disks and automatically adjust themselves to the surfaces thereof, and, riding thereon with a yielding pressure, keep the said surfaces clean and bright, preventing any accumulation of mud or dirt thereon that would prevent the edges of the disks from entering the soil.

I claim as my invention—

1. In a disk drill, the combination, with a boot and the disks mounted thereon, of scraper devices slidably supported between said disks and arranged to bear upon the inner surfaces thereof, and means yieldingly holding said devices against said surfaces.

2. In a disk drill, the combination, with a boot and the disks mounted thereon, of plates slidably supported on a common pivot between said disks and having edges adapted to bear upon the inner surfaces thereof, and means yieldingly holding said plates in contact with said surfaces.

3. In a disk drill, the combination, with a boot and the disks mounted thereon, of plates loosely mounted between said disks and having flanges adapted to bear upon the surfaces thereof, and means yieldingly engaging said flanges and permitting movement thereof in either direction, substantially as described.

4. In a disk drill, the combination, with a boot and the disks mounted thereon, of plates having slots and provided with flanges arranged to bear upon the inner surfaces of said disks, a bolt supported on said boot fitting loosely within said slots, and a spring provided on said bolt and engaging said flanges, for the purpose specified.

5. In a disk drill, the combination, with a boot and the disks mounted thereon, of overlapping plates having slots that register one with the other, a bolt carried by said boot and fitting loosely within said slots, flanges provided on said plates at an angle thereto and adapted to bear on the inner surfaces of said disks, and a spring carried by said bolts and having ends in engagement with said flanges, for the purpose specified.

6. The combination, with the drill-disks, of scraper devices yieldingly supported between them and having flanged edges adapted to bear upon the inner surfaces of the disks.

7. The combination, with the drill-disks, of scraper devices yieldingly supported between them and provided with flanged portions having beveled edges to engage the surfaces of said disks.

8. The combination, with the drill-disks, of scraper-plates supported between them, said plates being slidable on their support toward and from the surfaces of said disks, and a spring device for yieldingly holding said plates in contact with said disks.

9. The combination, with the drill-disks, of scraper-plates loosely mounted between them, a spring device engaging said plates and yieldingly holding them in contact with the inner surfaces of said disk, and said spring device permitting said plates to automatically adjust themselves on their support to the surfaces of said disk.

In witness whereof I have hereunto set my hand this 26th day of March, 1903.

OCTAVE A. POIRIER.

In presence of—
RICHARD PAUL,
C. G. HANSON.